UNITED STATES PATENT OFFICE.

WALLACE APPLETON BEATTY, OF NEW YORK, N. Y., ASSIGNOR, BY DIRECT AND MESNE ASSIGNMENTS, TO GEORGE W. BEADLE, OF NEW YORK, N. Y.

GRAPHOPHONE-RECORD BLANK.

1,158,964.      Specification of Letters Patent.      Patented Nov. 2, 1915.

No Drawing.      Application filed January 3, 1913.      Serial No. 740,078.

*To all whom it may concern:*

Be it known that I, WALLACE APPLETON BEATTY, a citizen of the United States, residing at New York, in the county of New York and State of New York, have invented certain new and useful Improvements in Graphophone-Record Blanks; and I do hereby declare the following to be a full, clear, and exact description of the invention, such as will enable others skilled in the art to which it appertains to make and use the same.

This invention relates to plastic products, and especially to graphophone records made from a novel compound to be disclosed below, and has for its object to produce a graphophone record which will not produce the foreign noises which are common to the present graphophone records, and will on the other hand, be more durable and less liable to wear than those which have heretofore been proposed.

To these ends the invention consists in the novel articles of manufacture composed of the novel compositions of matter more fully hereinafter disclosed and particularly pointed out in the claims.

In order that this invention may be more clearly understood, it is said:—In my prior application #702,046, filed June 6, 1912, entitled Artificial gums and process of producing the same, I have disclosed and claimed a new gum and method of making it, which method, when briefly stated, consists in forming a new compound from a mixture of acetone and phenol to which is added a small quantity of acid, in order to produce what I believe to be dioxy-diphenyl-dimethyl-methane. This new compound is then further acted upon, as stated in said application above, by formaldehyde, in order to produce a further tenacious product constituting the said new gum above mentioned. This new gum is found to be inodorous, insoluble in water, is relatively strong and tenacious, and it may be colored with dyes or with other substances. I find further that this new gum when first produced, is more or less soluble in alkali; that it becomes less and less soluble after it has been heated at say 100° C., until when it has been kept at that temperature for say two hours, it is scarcely soluble at all even in strong alkali. When brought to this condition, however, acids will convert it at ordinary temperatures into a mass which is insoluble in alkali. I find the gum is also soluble in alcohol, ether, acetone, glacial acetic acid, amyl alcohol, amyl acetate and acetylene tetrachlorid, or mixtures of these. It is, however, insoluble in oils, such as linseed oil, turpentine, and mineral oils. When in its insoluble condition, it is an inodorous transparent mass quite strong, non-brittle and tenacious. It is also quite hard and will not burn unless kept continually in the flame. In this condition of the gum, I have not found any solvent for it.

As an alternative method of making the gum insoluble, I may produce a solution of the same, out of one or more of the above solvents, and add sufficient acid to give to the said solution an acid reaction, rather than an alkaline one, whereupon I have discovered that the gum, upon drying, will itself go into its insoluble condition at ordinary temperatures.

In order to make graphophone records out of this new gum, I simply dissolve it to the proper consistency, preferring to form therefrom a plastic mass, and mold the same into the proper shape, whereupon the molded mass may be subjected to the usual process of recording speech, music, or other sounds, and it may then either be heated under the proper conditions to render it hard and insoluble, or if it has been made acid, as above stated, it may be left to dry at ordinary temperatures, whereupon it will become a hard and insoluble mass. I have found whether I employ the heating step or the acid step to secure the hard condition of the gum, it is sometimes desirable to carry it out at a pressure less than that of the atmosphere in order to remove the last traces of the solvent. I have further found that the gum in assuming its solid insoluble condition, neither expands nor contracts, and especially when it is mixed with fillers to be disclosed below, and therefore, it is especially adapted for making graphophone records. Furthermore, since the gum may be procured in a transparent or in a white condition, I am enabled to produce practically white or translucent records, which in itself is a novelty in this art. In addition to the above, the gum, as above intimated, will produce practically non-inflammable records which are not acted upon by moisture, acids, and other reagents. They are further not sensitive to changes in temperature, and therefore, the records produced from my gum are not subjected to the usual warping and distortions frequently encountered during shipment, owing to the fact that the records are subjected to an undue temperature either in storage or in transit.

In addition to the use of the gum itself for the above purposes, I may also, and in fact prefer to, fill this gum with a finely divided hard substance, such as very finely divided graphite, finely divided wood powder, lamp black, steel dust finely divided, or oxid of iron, such as, for example, $Fe_3O_4$, etc. The filling of the gum is easily accomplished either by making the gum into a relatively thin solution, thoroughly stirring the same and letting it set, or even by making a more plastic mass and thoroughly working the filler or fillers into it. I further find both when making the records out of the pure gum, as well as when making them out of the filled gum, it is desirable to subject the finished molded mass to a considerable pressure in a hydraulic press in order to properly solidify the mass, as well as to exclude air bubbles.

Not only may I make my records out of the gum, as above disclosed, but I may also make very efficient records out of the above dioxy-diphenyl-dimethyl-methane, mixed with say, cellulose acetate in the proportion of seventy-five parts of the acetate to twenty-five parts of the dioxy-diphenyl-dimethyl-methane. This mixture is readily accomplished by dissolving its constituents in a common solvent, such as acetone, and allowing it to set. The mixture may be then either used in its relatively pure condition, or it may be likewise filled, as mentioned above, with various substances. I also prefer to solidify the finished molded product by pressure, as stated in connection with the gum.

Not only may I employ the mixture just stated, but I find it further useful to employ, under certain conditions, a mixture composed of say twenty-five parts of the dioxy-diphenyl-dimethyl-methane to say seventy-five parts of nitro-cellulose, such as the trinitrocellulose employed in the manufacture of celluloid. This cellulose mixture is treated in all respects like the first mentioned mixture.

In addition to recording directly upon the new mass constituting the graphophone record blank, as above mentioned, I may either make a master record, or otherwise procure a master record, and make duplicate records therefrom out of the graphophone record blanks made from each of the three substances above disclosed.

By the term ketone found in the claims I mean to include only acetone, or its immediate homologues such as ethyl-methyl-ketone, or diethyl-ketone; by the term phenol I mean to include only carbolic acid and the cresols; and by the term aldehyde I mean to include only formaldehyde or its polymers, or its ammonia condensation products such as hexa-methylene-tetra-amin and acet-aldehyde.

It is obvious that those skilled in the art may vary the details of the procedure without departing from the spirit of my invention, and further, that homologues of the compounds mentioned may be employed, and still come within the spirit of my invention. Therefore, I do not wish to be limited to the above disclosure, except as may be required by the claims.

What I claim is:—

1. The herein described new article of manufacture consisting of a graphophone record blank, containing a condensation product of a ketone, a phenol and an aldehyde.

2. The herein described new article of manufacture consisting of a graphophone record blank, containing a condensation product of acetone, phenol and formaldehyde.

3. The herein described new article of manufacture consisting of a graphophone record blank containing a condensation product of a ketone, a phenol, an aldehyde and a filler.

In testimony whereof, I affix my signature, in presence of two witnesses.

WALLACE APPLETON BEATTY.

Witnesses:
T. A. WITHERSPOON,
R. M. PARKER.